US008374358B2

(12) United States Patent
Buck et al.

(10) Patent No.: US 8,374,358 B2

(45) Date of Patent: Feb. 12, 2013

(54) METHOD FOR DETERMINING A NOISE REFERENCE SIGNAL FOR NOISE COMPENSATION AND/OR NOISE REDUCTION

(75) Inventors: Markus Buck, Biberach (DE); Tobias Wolff, Neu-Ulm (DE); Toby Christian Lawin-Ore, Oldenburg (DE); Samuel Ngouoko Mboungueng, Ulm (DE); Gerhard Schmidt, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 335 days.

(21) Appl. No.: 12/749,066

(22) Filed: Mar. 29, 2010

(65) Prior Publication Data

US 2010/0246851 A1 Sep. 30, 2010

(30) Foreign Application Priority Data

Mar. 30, 2009 (EP) .................................... 09004609

(51) Int. Cl.
*H04B 15/00* (2006.01)
*H04R 3/00* (2006.01)

(52) U.S. Cl. ......................... 381/94.1; 381/94.2; 381/92

(58) Field of Classification Search ................. 381/71.1, 381/71.11, 71.12, 94.1, 94.7, 91, 92; 704/210, 704/226

See application file for complete search history.

(56) References Cited

U.S. PATENT DOCUMENTS 5,740,256 A * 4/1998 Castello Da Costa et al. ............................ 381/94.7
2008/0232607 A1* 9/2008 Tashev et al. .............. 381/71.11

FOREIGN PATENT DOCUMENTS

WO WO 2006/027707 A1 3/2006
WO WO 2009/034524 A1 3/2009

OTHER PUBLICATIONS

Extended European Search Report; Application No. 09004609.5-2225; Jun. 8, 2009.

Widrow, et al., "Adaptive Noise Cancelling: Principles and Applications," *Proceedings of the IEEE*, vol. 63, No. 12, Dec. 1975, pp. 1692-1717.

Warsitz, et al., "Blind Acoustic Beamforming Based on Generalized Eigenvalue Decomposition," *IEEE Transactions on Audio, Speech, and Language Processing*, vol. 15, No. 5, Jul. 2007, pp. 1529-1539.

Van Veen, et al., "Beamforming: A Versatile Approach to Spatial Filtering," *IEEE ASSP Magazine*, Apr. 1988, pp. 4-24.

Lombard, et al., "Multichannel Cross-Talk Cancellation in a Call-Center Scenario Using Frequency-Domain Adaptive Filtering," in *Proc. Int. Workshop on Acoustic Echo and Noise Control* (IWAENC-08), Sep. 2008, 4 Pages.

Gannot, et al., "Beamforming Methods for Multi-Channel Speech Enhancement," *Proc. Int. Workshop on Acoustic Echo and Noise Control* (IWAENC-99), Pocono Manor PA, Sep. 1999, pp. 96-99.

(Continued)

*Primary Examiner* — Xu Mei
*Assistant Examiner* — David Ton
(74) *Attorney, Agent, or Firm* — Sunstein Kann Murphy & Timbers LLP

(57) ABSTRACT

The invention provides a method for determining a noise reference signal for noise compensation and/or noise reduction. A first audio signal on a first signal path and a second audio signal on a second signal path are received. The first audio signal is filtered using a first adaptive filter to obtain a first filtered audio signal. The second audio signal is filtered using a second adaptive filter to obtain a second filtered audio signal. The first and the second filtered audio signal are combined to obtain the noise reference signal. The first and the second adaptive filter are adapted such as to minimize a wanted signal component in the noise reference signal.

25 Claims, 7 Drawing Sheets

OTHER PUBLICATIONS

Griffiths, et al., "An Alternative Approach to Linearly Constrained Adaptive Beamforming," *IEEE Transactions on Antennas and Propagation*, vol. AP-30, No. 1., Jan. 1982, pp. 27-34.

Herbordt, et al., "Computationally Efficient Frequency-Domain Robust Generalized Sidelobe Canceller," *Proc. Int. Workshop on Acoustic Echo and Noise Control* (IWAENC-01), Sep. 2001, pp. 51-55.

Hoshuyama, et al., "A Robust Adaptive Beamformer for Microphone Arrays with a Blocking Matrix Using Constrained Adaptive Filters," *IEEE Transactions on Signal Processing*, vol. 47, No. 10, Oct. 1999, pp. 2677-2684.

Wolff, et al., "A Subband Based Acoustic Source Localization System for Reverberant Environments," *Schmidt, in Proc. ITG-Fachtagung Sprachkommunikation*, Oct. 2008, 4 Pages.

* cited by examiner

METHOD FOR DETERMINING A NOISE REFERENCE SIGNAL FOR NOISE COMPENSATION AND/OR NOISE REDUCTION

PRIORITY

The present U.S. patent application claims priority form European Patent Application No. 09004609.5 filed on Mar. 30, 2009 entitled "A Method for Determining a Noise Reference Signal for Noise Compensation and/or Noise Reduction" which is incorporated herein by reference in its entirety.

TECHNICAL FIELD

The present invention relates to a method for determining a noise reference signal for noise compensation and/or noise reduction.

BACKGROUND ART

Noise compensation and/or noise reduction in acoustic signals is an important issue, for example, in the field of speech signal processing. The quality of an audio signal, e.g. of a speech signal, is often impaired by various interferences stemming from different noise sources. Hands-free telephony systems or speech recognition systems, for instance, may be used in a noisy environment such as in a vehicular cabin. In this case, the voice signal may be interfered by background noise such as noise of the engine or noise of the rolling tires. Noise compensation methods may be used to compensate for the background noise thereby improving the signal quality and reducing misrecognitions.

Common methods for noise compensation and/or noise reduction usually involve multi-channel systems. For example, two-channel systems are used, wherein a first channel comprises a disturbed audio signal and a second channel comprises a noise reference signal.

FIG. 6 shows an example of such a system. Two microphones 605 are configured to detect a wanted signal of a wanted sound source, for example, a speech signal. A first microphone signal is output by a first microphone on a first signal path and a second microphone signal is output by a second microphone on a second signal path. The first and the second microphone signals comprise a noise components 603 and 604, respectively, originating from one or more noise sources and a wanted signal component originating from the wanted sound source. The transfer between the wanted signal and the first and the second microphone signals may be modeled by a first and a second transfer function 601 and 602, respectively. The second microphone signal is filtered by an interference canceller 609, which comprises an adaptive filter and determines an estimate for the noise component in the first microphone signal based on the second microphone signal. The output of the interference canceller 609 is subtracted from the first microphone signal by a subtractor 610, thereby obtaining an output signal with reduced noise. The quality of the output signal depends on the wanted signal component in the second microphone signal.

In an ideal case, the second microphone signal and hence the output of the interference canceller 609 do not comprise a wanted signal component. The quality of noise compensation in the output signal with reduced noise, however, also depends on the correlation between the noise components 603 and 604. A low correlation implies that the estimate of the interference canceller 609 is a bad estimate for the noise component of the first microphone signal and that therefore the quality of the output signal with reduced noise is low. To achieve a higher correlation, and hence a better estimate for the noise reference signal, the two microphones 605 should have a small relative distance from each other. As a consequence, however, the second microphone signal will also comprise a significant wanted signal component.

In order to solve this problem, current multi-channel systems primarily make use of a so-called "blocking matrix" in order to block a wanted signal component in the second signal path.

FIG. 7 shows such a system comprising two microphones 705, an interference canceller 709 and a first subtractor 710 configured to subtract the estimate of the noise component from a first microphone signal. The first microphone signal from a first signal path may be used as input for an adaptive filter 715. The output of the adaptive filter 715 may be combined with a second microphone signal using a second subtractor 716, thereby obtaining a noise reference signal on a second signal path. This noise reference signal may be used as an input for the interference canceller 709 and the output of the interference canceller 709 may be subtracted from the first microphone signal using subtractor 710 to obtain an output signal with reduced noise. The first and the second microphone signal may comprise a noise component 703 and 704, respectively.

A first transfer function 701 modeling the transfer between a wanted signal and the first microphone signal on the first signal path may be denoted by $G_1(e^{j\Omega})$ and a second transfer function 702 modeling the transfer between the wanted signal and the second microphone signal on the second signal path may be denoted by $G_2(e^{j\Omega})$. Here j denotes the imaginary unit and Ω denotes a frequency variable. In order to obtain a noise reference signal with little or no wanted signal component, a transfer function, H, of the adaptive filter 715 may read)

$$H(e^{j\Omega})=G_2(e^{j\Omega})G_1^{-1}(e^{j\Omega})$$

In other words, the above-described transfer function of the adaptive filter 715 comprises an inverse of the first transfer function. This can yield an impaired noise reference signal if the value of the first transfer function approaches zero. This effect can result from room acoustics. If there is a strong reflecting boundary near a microphone, there are essentially two paths to the microphone: a direct path and a reflected path. Since the lengths of the two paths differ, the respective sound arrives at the microphone with a difference in phase. Depending on the frequency of the sound, the phase difference may either lead to constructive or destructive interference. Destructive interference can cause the signal to be destroyed at a particular frequency. In the art, this is referred to as a comb-filter because the destructive interference occurs periodically along the frequency axis. As a consequence the magnitude of the transfer function looks like a comb. There may be multiple such frequencies where the room transfer-function shows zeros depending on the delay between the direct path and the reflected component. It should be recognized that this discussion has been simplified, as there will be more that two paths.

Other known methods for determining a noise reference signals may similarly yield an impaired noise reference signal. The quality of noise compensation and/or noise reduction, however, depends to a large extent on the quality of the noise reference signal. Therefore, there is the need to provide a method for determining a more accurate noise reference signal for noise compensation and/or noise reduction.

SUMMARY OF THE INVENTION

According to the present invention a method and a system are provided for determining an accurate noise reference signal for noise compensation and/or noise reduction.

In a first embodiment, the method requires receiving a first audio signal on a first signal path and a second audio signal on a second signal path. The first audio signal is filtered using a first adaptive filter to obtain a first filtered audio signal. The second audio signal is filtered using a second adaptive filter to obtain a second filtered audio signal. Then, the first and the second filtered audio signals are combined to obtain the noise reference signal. The first and the second adaptive filters are adapted such as to minimize a wanted signal component in the noise reference signal. By using two adaptive filters to determine the noise reference signal, a wanted signal component in the noise reference signal can be effectively minimized. In this way, the quality of the noise reference signal can be improved compared to prior art methods.

By using two adaptive filters, the filters used can approximate a transfer function without poles. For example, the respective filters are the room transfer functions R1 and R2 wherein the source signal can be called S. Each of the signals S·R1 and S·R2 are filtered by the adaptive filters. The difference between the signals is S·R1·H1−S·R2·H2. Thus, this difference becomes zero if H2=R1 and H1=R2 where the speech is blocked and a high-quality noise reference signal is obtained. This solution can be achieved even if the room transfer functions exhibit "comb-filter" effects.

The method may be performed in the frequency domain, in particular in a sub-band domain. In the frequency domain, each of the first audio signal and the second audio signal may correspond to one or more short-time spectra. In this case, the first audio signal and the second audio signal correspond to a first audio signal spectrum and a second audio signal spectrum, respectively. The first and the second audio signal may be determined using short-time Fourier transforms of time-dependent audio signals. In this case, each of the first and the second audio signal correspond to a plurality of short-time Fourier coefficients, in particular for predetermined frequency nodes. Each of the first and the second filtered audio signal and the noise reference signal may correspond to a short-time spectrum as well. Alternatively, the method may be performed in the time domain, in particular in a discrete time domain.

The first and the second audio signal generally comprise a noise component and may comprise a wanted signal component. Consequently, also the first and the second filtered audio signal generally comprise a noise component and may comprise a wanted signal component.

The wanted signal component may be based on a wanted signal originating from a wanted sound source. In particular, the wanted signal from the wanted sound source may be received by a microphone array, in particular wherein the microphone array comprises at least two microphones. The wanted sound source may have a variable distance from the microphone array. The first and the second audio signal may correspond to or be based on microphone signals emanating from at least two microphones of the microphone array.

One or more short-time spectra of the first and the second audio signal may comprise only a noise component. In this case, the wanted sound source may be temporarily inactive. The method may comprise detecting whether the first and/or the second audio signal comprise a wanted signal component. In other words, the method may comprise detecting whether the wanted sound source is active, in particular based on the noise reference signal. If no short time spectrum of the first and the second audio signal comprises a wanted signal component, the wanted sound source is inactive. In this case, no noise compensation may be performed.

If the first and the second audio signal comprise a wanted signal component, also the noise reference signal may comprise a wanted signal component, wherein the first and the second adaptive filter are adapted such as to minimize the wanted signal component in the noise reference signal. A wanted signal component in the noise reference signal may be minimized such that it vanishes or that it falls below a predetermined detection threshold.

The first and the second adaptive filter may be adapted according to a predetermined criterion, in particular according to a predetermined optimization criterion. The predetermined criterion may be based on a normalized least mean square method or on a method based on a minimization of the signal-to-noise ratio of the noise reference signal. In particular, the predetermined criterion may be based on the signal-to-noise ratio of the noise reference.

Filtering the first audio signal may be performed on an intermediate signal path, wherein the intermediate signal path connects the first and the second signal path. In other words, the first adaptive filter may be arranged on an intermediate signal path connecting the first and the second signal path. Filtering the second audio signal and combining the first and the second filtered audio signal may be performed on the second signal path.

A first transfer function may model a transfer from a wanted signal originating from a wanted sound source to the first signal path and a second transfer function may model a transfer from the wanted signal originating from the wanted sound source to the second signal path, wherein the transfer function of the first adaptive filter may be based on the second transfer function and/or wherein the transfer function of the second adaptive filter may be based on the first transfer function.

In general, a transfer function may model a relation between an input and an output signal of a system. In particular, the transfer function applied to an input signal may yield the output signal of the system. In this case, the first transfer function may model the relation between a wanted signal originating from a wanted sound source and the first audio signal, in particular the wanted signal component of the first audio signal. The second transfer function may model the relation between the wanted signal originating from the wanted sound source and the second audio signal, in particular the wanted signal component of the second audio signal.

A transfer function in the frequency domain may correspond to or be associated with an impulse response in the time domain.

The transfer function of the first and/or the second adaptive filter may be further based on a predetermined or arbitrary transfer function. In particular, the transfer function of the first adaptive filter may be based on a combination, in particular on a product, of the second transfer function and a predetermined or arbitrary transfer function. The transfer function of the second adaptive filter may be based on a combination, in particular on a product, of the first transfer function and the predetermined or arbitrary transfer function. In other words, the transfer function of the first adaptive filter may model a combination of the second transfer function and an arbitrary transfer function and the transfer function of the second adaptive filter may model a combination of the first transfer function and the arbitrary transfer function. The predetermined or arbitrary transfer function may be the same for the transfer function of the first adaptive filter and the transfer function of the second adaptive filter.

For example, the transfer function of the first and the second adaptive filter, $H_1$ and $H_2$, respectively, may read:

$$H_1(e^{j\Omega},k)=G_2(e^{j\Omega},k)\cdot\tilde{G}(e^{j\Omega},k),\text{ and}$$

$$H_2(e^{j\Omega},k)=G_1(e^{j\Omega},k)\cdot\tilde{G}(e^{j\Omega},k).$$

Here $G_1(e^{j\Omega},k)$ denotes the first transfer function, $G_2(e^{j\Omega},k)$ denotes the second transfer function and $\tilde{G}(e^{j\Omega},k)$ denotes the arbitrary or predetermined transfer function. The parameter $\Omega$ denotes a frequency variable, for example a frequency node or frequency sampling point of a sub-band, j denotes the imaginary unit and k denotes the time.

The arbitrary or predetermined transfer function may be constant. In particular, the arbitrary transfer function may be equal to 1. In this case, the transfer function of the first adaptive filter models the second transfer function and the transfer function of the second adaptive filter models the first transfer function.

The transfer function of the first and/or the second adaptive filter may be modeled by filter coefficients of the first and/or the second adaptive filter. In other words, filter coefficients of the first and the second adaptive filter may be adapted such as to model an above-described transfer function of the first and the second adaptive filter. In particular, the filter coefficients of the first and the second adaptive filter may be adapted such as to minimize a wanted signal component in the noise reference signal by modeling a transfer function as described above.

The above-described methods for determining a noise reference signal may comprise adapting the first and the second adaptive filter. Adapting the first and the second adaptive filter may comprise modifying or updating a filter coefficient or a set of filter coefficients of the first and/or the second adaptive filter to obtain a modified filter coefficient or a set of modified filter coefficients. Adapting the first and the second adaptive filter may be based on a predetermined criterion such as the above-described predetermined criterion, in particular on a predetermined optimization criterion.

Adapting the first and the second adaptive filter may be based on a normalized least mean square method or on a method based on a minimization of the signal-to-noise ratio of the noise reference signal. In other words, the predetermined criterion may be based on a normalized least mean square method or on a method based on a minimization of the signal-to-noise ratio of the noise reference signal.

The normalized least mean square method may comprise modifying a set of filter coefficients of the first and/or second adaptive filter based on the noise reference signal and/or based on the power or power density of the first and/or the second audio signal. The power density may correspond to a power spectral density. The normalized least mean square method may comprise determining a product of the first or the second audio signal and the noise reference signal, in particular, the complex conjugate of the noise reference signal. In particular, the normalized least mean square method may comprise modifying one or more filter coefficients of the first and/or the second adaptive filter by adding an adaptation term.

The adaptation term may comprise a ratio between the product of the first or second audio signal with the noise reference signal, in particular, the complex conjugate of the noise reference signal, and the power or power density of the first and second audio signal, in particular the sum of the power or power density of the first and second audio signal. The adaptation term may comprise a free parameter, in particular corresponding to an adaptation step size. The value of the free parameter may lie within a predetermined range. The sign of the free parameter may be different for the adaptation terms associated with the filter coefficients of the first and the second adaptive filter.

The method based on a minimization of the signal-to-noise ratio may comprise determining a power or power density of the first and of the second audio signal and/or determining a power or power density of the noise component of the first and of the second audio signal. The first and the second audio signal may be combined to an audio signal vector. In particular, the audio signal vector may comprise the one or more short-time spectra of the first and the second audio signal. In this case, the power or power density of the first and of the second audio signal may correspond to the power or power density of the audio signal vector.

The filter coefficients of the first and the second adaptive filter may be combined to a filter coefficient vector. In this case, the noise reference signal may correspond to a product of the Hermitian transpose of the filter coefficient vector and the audio signal vector. The Hermitian transpose of a vector may correspond to the transposed and complex conjugated vector.

The power density of the audio signal vector may correspond to the expectation value of the product between the audio signal vector and the Hermitian transposed of the audio signal vector. In this case, the power density corresponds to a power density matrix.

The audio signal vector may correspond to a sum of a wanted signal vector and a noise vector, wherein the wanted signal vector comprises the wanted signal components of the first and of the second audio signal and the noise vector comprises the noise components of the first and of the second audio signal. If the wanted sound source is inactive, the audio signal vector corresponds to the noise vector. In this case, a power density matrix of the noise vector may be estimated or determined.

An average or mean power or power density of the noise vector, in particular of the noise components of the first and of the second audio signal, may be determined based on the trace of the power density matrix of the noise vector.

The signal-to-noise ratio of the noise reference signal may correspond to a ratio between a wanted signal component in the noise reference signal and a noise component in the noise reference signal, in particular between the power or power density of the wanted signal component in the noise reference signal and the power or power density of the noise component in the noise reference signal.

The method based on a minimization of the signal-to-noise ratio may comprise minimizing the signal-to-noise ratio of the noise reference signal. In this way, a wanted signal component in the noise reference signal can be minimized. In other words, the predetermined optimization criterion may correspond to a minimization of the signal-to-noise ratio of the noise reference signal.

Minimizing the signal-to-noise ratio may comprise determining the signal-to-noise ratio based on the power or power density of the first and the second audio signal and on the power or power density of the noise component of the first and second audio signal.

Minimizing the signal-to-noise ratio of the noise reference signal may be based on the power or power density of the first and the second audio signal and on the power or power density of the noise component of the first and second audio signal. In particular, minimizing the signal-to-noise ratio of the noise reference signal may be based on the power density matrix of the audio signal vector and on the power density matrix of the noise vector. In this case, the method may comprise determining the power density matrix of the audio signal vector and the power density matrix of the noise vector.

Minimizing the signal-to-noise ratio may be based on a constraint for the power or power density of the noise component in the noise reference signal. In particular, the power or power density of the noise component in the noise reference signal may be equal to the mean power or mean power density of the noise components in the first and second audio signal.

Minimizing the signal-to-noise ratio may be based on a Lagrangian method, i.e. based on Lagrange multipliers, and/or on a method based on a gradient descent. In particular, a Lagrangian method may be used for minimizing the signal-to-noise ratio using a constraint.

Adapting the first and the second adaptive filter may comprise normalizing modified filter coefficients of the first and/or the second adaptive filter using a predetermined normalization factor. In particular, a set of filter coefficients may be modified based on a normalized least mean square method or on a method based on a minimization of the signal-to-noise ratio of the noise reference signal as described above and thereafter, as a second step, normalized using a predetermined normalization factor. By normalizing the modified filter coefficients, an attenuation of the amplitude of the first and the second filtered audio signal may be avoided.

The predetermined normalization factor may correspond to a scalar. The predetermined normalization factor may be based on one or more filter coefficients or on one or more modified filter coefficients of the first and/or the second adaptive filter. In particular, the predetermined normalization factor may correspond to the value of a predetermined modified filter coefficient of the first or the second adaptive filter. In this case, the predetermined normalization factor can be complex valued.

The predetermined normalization factor may be based on an absolute value of a modified filter coefficient of the first or the second adaptive filter. In particular, the predetermined normalization factor may correspond to the absolute value of a predetermined modified filter coefficient of the first or the second adaptive filter. In this case, the predetermined normalization factor is real valued.

The predetermined normalization factor may correspond to the maximum value of the absolute values of the modified filter coefficients of the first and the second adaptive filter.

Alternatively, the predetermined normalization factor may be based on a linear combination of absolute values of modified filter coefficients of the first and the second adaptive filter. In particular, the predetermined normalization factor may correspond to a norm of the modified filter coefficients of the first and the second adaptive filter. In this case, the predetermined normalization factor may correspond to the square root of the sum of the squared absolute values of the modified filter coefficients of the first and of the second adaptive filter.

If the wanted sound source is inactive, i.e. if the first and/or the second audio signal comprise no wanted signal component, the step of adapting the first and the second adaptive filter may be omitted.

The first and the second adaptive filter may each correspond to adaptive finite impulse response (FIR) filters. The first and the second audio signal may correspond to a sequence of short-time spectra, in particular to a consecutive sequence. In particular, the first and the second audio signal may comprise a temporal sequence of short-time spectra. The number of short-time spectra in the sequence may correspond to the filter order or filter length of the employed filter. In other words, the number of short-time spectra in the first audio signal may be equal to the filter order of the first adaptive filter and the number of short-time spectra in the second audio signal may be equal to the filter order of the second adaptive filter.

The first and the second audio signal may each be a microphone signal or a beamformed signal, in particular emanating from different microphones or beamformers. In other words, the first signal path may comprise at least one microphone and the second signal path may comprise at least one microphone, in particular wherein the at least one microphone of the second signal path differs from the at least one microphone of the first signal path. The first and/or second signal path may further comprise a beamformer. The first audio signal may correspond to an output signal of a microphone or to an output signal of a beamformer in the first signal path and the second audio signal may correspond to an output signal of a microphone or to an output signal of a beamformer in the second signal path.

The predetermined normalization factor may be based on the power or power density of the noise component in the first or the second audio signal, in particular wherein the first or the second audio signal is a beamformed signal. In other words, the predetermined normalization factor may be based on the power or power density of a beamformed signal. The predetermined normalization factor may be proportional to the ratio between the power or power density of the noise component in the beamformed signal and the power or power density of the noise component in the noise reference signal. In particular, the predetermined normalization factor may be proportional to the square root of the ratio between the power or power density of the noise component in the beamformed signal and the power or power density of the noise component in the noise reference signal.

If adapting the first and the second adaptive filter is based on a minimization of the signal-to-noise ratio of the noise reference signal, a normalization of the modified filter coefficients may be implicit in the constraint used for the minimization. In this case, a normalization of modified filter coefficients using a predetermined normalization factor may be omitted. The constraint for the minimization may be based on the power or power density of the beamformed signal.

Combining the first and the second filtered audio signal may comprise subtracting the first filtered audio signal from the second filtered audio signal. In this way, the wanted signal component can be blocked in the second signal path. In other words, combining the first and the second filtered audio signal may correspond to blocking the wanted signal component in the second signal path. The noise reference signal may correspond to a blocking signal.

The combination of the first and the second filtered audio signal to obtain the noise reference signal may be modeled by a blocking matrix. In this case, the blocking matrix applied to the first and the second audio signal yields the noise reference signal. In other words, the invention also provides a blocking matrix, wherein the blocking matrix comprises a transfer function of the first adaptive filter and a transfer function of the second adaptive filter, and wherein if the blocking matrix is applied to a first and a second audio signal a noise reference signal is obtained according to one of the above-described methods.

The above-described methods may be performed for a plurality of audio signals, in particular stemming from different microphones of a microphone array. In this case, a blocking matrix applied to microphone signals of the microphone array may yield a plurality of noise reference signals, i.e. two or more noise reference signals. In particular, the first filtered audio signal may be combined with further audio signals, in particular pairwise, to obtain further noise reference signals. For example, the first filtered audio signal may be combined with a third filtered audio signal to obtain a second noise reference signal.

The above-described methods may be performed repeatedly, in particular for subsequent audio signals. In particular, the first and the second audio signal may be associated with a predetermined time or time period. The above-described methods may be performed for a plurality of times or time periods, in particular for subsequent times or time periods.

In this context, noise compensation may correspond to noise cancellation or noise suppression. In particular, a method for noise compensation may be used to cancel, suppress or compensate for noise in an audio signal, for example in the first audio signal.

The invention further provides a method for processing an audio signal for noise compensation, comprising the steps of:

determining a noise reference signal according to one of the above described methods, using a first audio signal on a first signal path and a second audio signal on a second signal path, filtering the noise reference signal on the second signal path using a third adaptive filter to obtain a filtered noise reference signal, and combining the first audio signal from the first signal path and the filtered noise reference signal to obtain an output signal with reduced noise.

In this way, the noise component in the first audio signal may be minimized. In particular, combining the first audio signal and the filtered noise reference signal may comprise subtracting the filtered noise reference signal from the first audio signal.

The first audio signal and the output signal with reduced noise may each comprise a signal component and a noise component, wherein the third adaptive filter is adapted such as to minimize the noise component in the output signal with reduced noise. The third adaptive filter may correspond to an FIR filter, in particular an adaptive FIR filter.

By determining the noise reference signal according to one of the above described methods, the quality of noise compensation in the first audio signal may be improved compared to noise compensation based on a noise reference signal determined using prior art methods.

The invention further provides a computer program product, comprising one or more computer readable media having computer executable instructions for performing the steps of one of the above described methods, when run on a computer.

The invention further provides a system for audio signal processing, in particular configured to perform one of the above described methods, comprising a receiver for receiving a first and a second audio signal, a first adaptive filter to obtain a first filtered audio signal, a second adaptive filter to obtain a second filtered audio signal, and subtractor for combining the first and the second filtered audio signal.

The system allows to determine a noise reference signal according to one of the above described methods. In particular, the first and the second adaptive filter may be adapted such as to minimize a wanted signal component in an output signal of the subtractor, i.e. in the noise reference signal.

The system may be further configured to perform one of the above described methods for noise compensation.

In particular, the system may further comprise a third adaptive filter to obtain a filtered noise reference signal. The subtractor may correspond to a second subtractor and the system may further comprise a first subtractor for combining the first audio signal and the filtered noise reference signal. An output signal of the first subtractor may correspond to an output signal with reduced noise. In particular, the third adaptive filter may be adapted such as to minimize a noise component in the output signal with reduced noise.

In particular, the system may comprise:

a microphone array comprising at least two microphones, wherein an output of a first microphone of the microphone array is connected to a first subtractor on a first signal path and connected to a first adaptive filter on an intermediate signal path, an output of a second microphone of the microphone array connected to a second adaptive filter on a second signal path, an output of the first adaptive filter and an output of the second adaptive filter, both connected to a second subtractor on the second signal path, an output of the second subtractor connected to a third adaptive filter on the second signal path, and an output of the third adaptive filter connected to the first subtractor.

Such a system allows to compensate for noise in a first signal path based on a noise reference signal, wherein the noise reference signal may be obtained by blocking a wanted signal component in a second signal path. In particular, the second subtractor and the first and the second adaptive filter may be configured such as to yield a noise reference signal according to one of the above-described methods. In this case, the output signal of the first microphone may correspond to the first audio signal and the output signal of the second microphone may correspond to the second audio signal.

The third adaptive filter and the first subtractor may be configured to yield an output signal with reduced noise according to one of the above-described methods.

The system may further comprise a beamformer, in particular an adaptive or a fixed beamformer, and/or an echo compensator, in particular an adaptive echo canceller or acoustic echo canceller. A beamformer may be used for spatial filtering of audio signals. In this case, the microphone array may be connected to the beamformer. The beamformer may be arranged in the first signal path. In this case, an output of the beamformer may be connected to the first subtractor on the first signal path and connected to the first adaptive filter on the intermediate signal path. In this case, an output signal of the beamformer in the first signal path corresponds to the first audio signal. Additionally or alternatively, a beamformer may be arranged in the second signal path. In this case, an output signal of the beamformer in the second signal path may correspond to the second audio signal.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

To improve the signal quality of an audio signal, a method for noise compensation may be performed (see e.g. "Adaptive noise cancellation: Principles and applications" by B. Widrow et al., in Proc. of the IEEE, Vol. 63, No. 12, December 1975, pp. 1692-1716). In particular, the audio signal may be divided into sub-bands by some sub-band filter and a noise compensation method may be applied to each of the sub-bands. The method for noise compensation may utilize a multi-channel system, i.e. a system comprising a microphone array. Microphone arrays are also used in the field of source localization (see e.g. "Microphone Arrays for Video Camera Steering" by Y. Huang et al., in S. Gay, J. Benesty (Eds.), Acoustic Signal Processing for Telecommunication, Kluwer, Boston, 2000, pp. 239-259).

Figure 4:
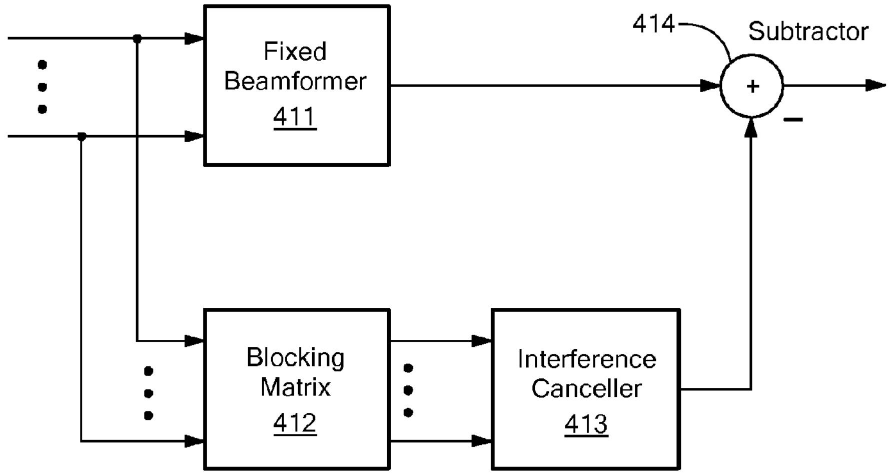
FIG. 4 shows a system for noise compensation comprising a beamformer, a blocking matrix and an interference canceller.

FIG. 4 shows the general structure of a so-called "general sidelobe canceller" which comprises two signal processing paths: a first (or lower) adaptive signal path with a blocking matrix 412 and an interference canceller 413 and a second (or upper) non-adaptive signal path with a fixed beamformer 411 (see e.g. "Beamforming: a versatile approach to spatial filtering", by B. Van Veen and K. Buckley, IEEE ASSP Magazine, Vol. 5, No. 2, April 1988, pp. 4-24). An adaptive beamformer may be used instead of the fixed beamformer 411. A combination module (e.g. a subtractor) 414 may be used to subtract an output signal of the interference canceller 413 from the beamformed signal. The blocking matrix 412 may be used to estimate noise reference signals, wherein a noise reference signal comprises a minimized wanted signal component. In particular, the blocking matrix 412 applied to microphone signals may yield the noise reference signals. The blocking matrix 412 may be realized by adaptive filter and subtractor as described above. Different kinds of blocking matrices may be used.

One example is a fixed blocking matrix (see, e.g. "An alternative approach to linearly constrained adaptive beamforming" by L. Griffiths and C. Jim, IEEE Trans. on Antennas and Propagation, Vol. 30, No. 1, January 1982, pp. 27-34). The fixed blocking matrix, however, relies on an idealized sound field, in which the wanted signal reaches the microphones of the microphone array as a plane wave from a predetermined direction. In practice, however, variations from the predetermined direction can occur, for example, due to reflections. As a consequence, the output signal of the subtractor 414 may comprise a significant wanted signal component. One example for a fixed blocking matrix is the so-called "central difference matrix" which realizes a subtraction of audio signals from neighboring or adjacent channels or signal paths. For four microphone signals stemming from four different microphones, the fixed blocking matrix may read:

$$B = \begin{pmatrix} 1 & -1 & 0 & 0 \\ 0 & 1 & -1 & 0 \\ 0 & 0 & 1 & -1 \end{pmatrix}$$

Figure 5:
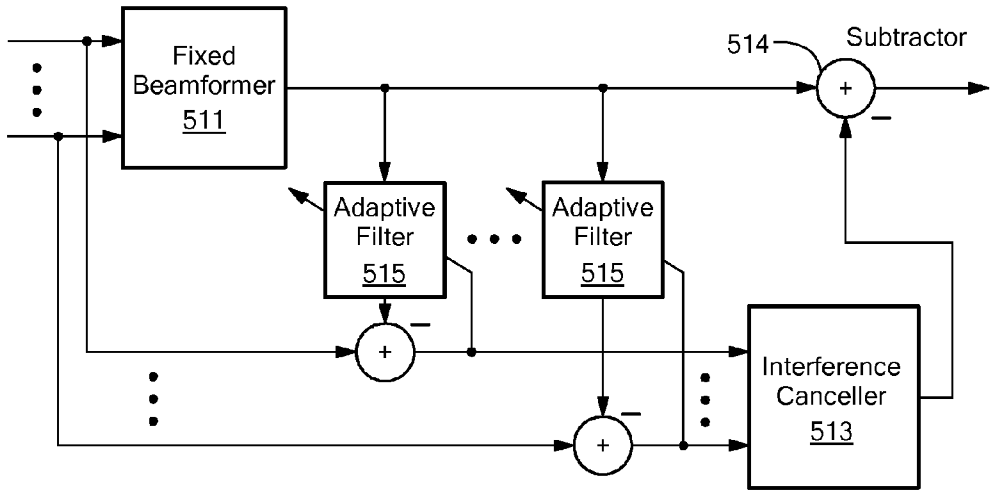
FIG. 5 shows a system for noise compensation comprising a fixed beamformer.
Figure 6:
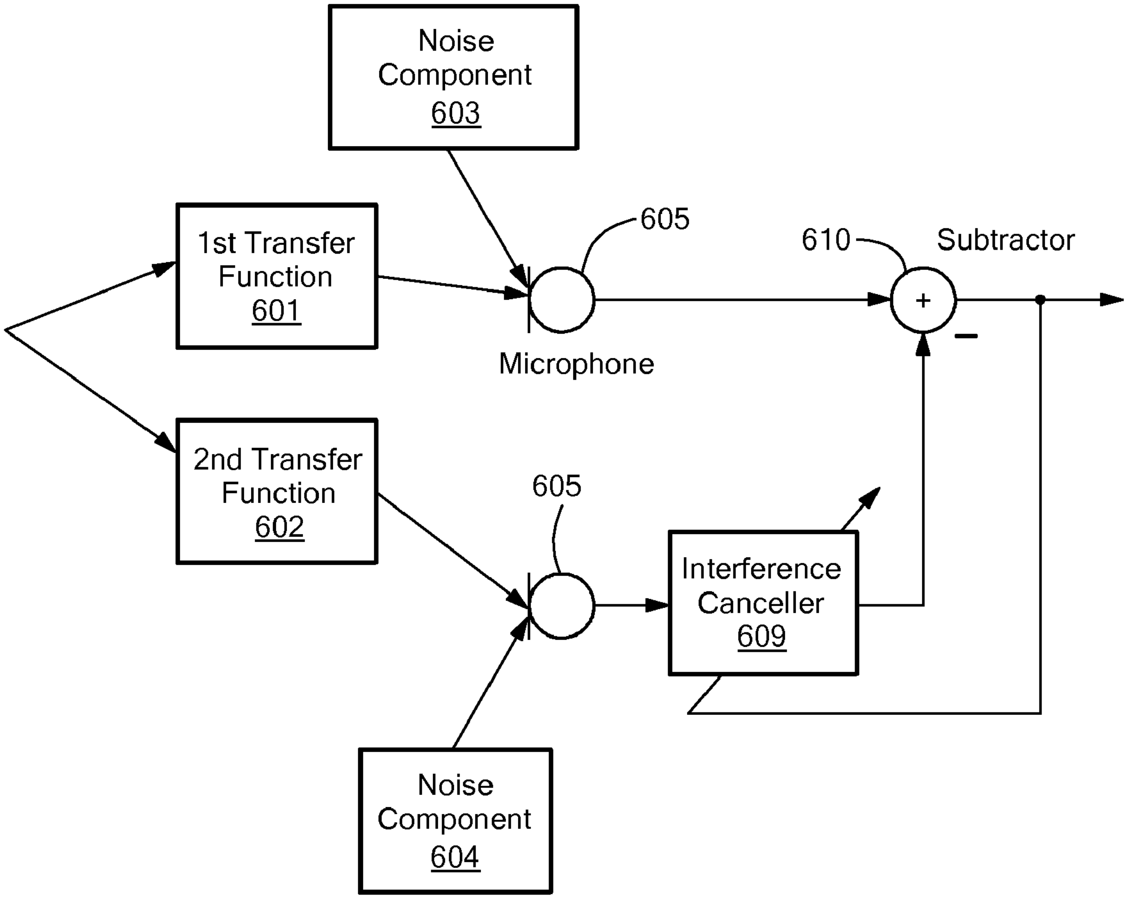
FIG. 6 (PRIOR ART)
FIG. 6 shows a system for noise compensation comprising a first signal path and a second signal path.
Figure 7:
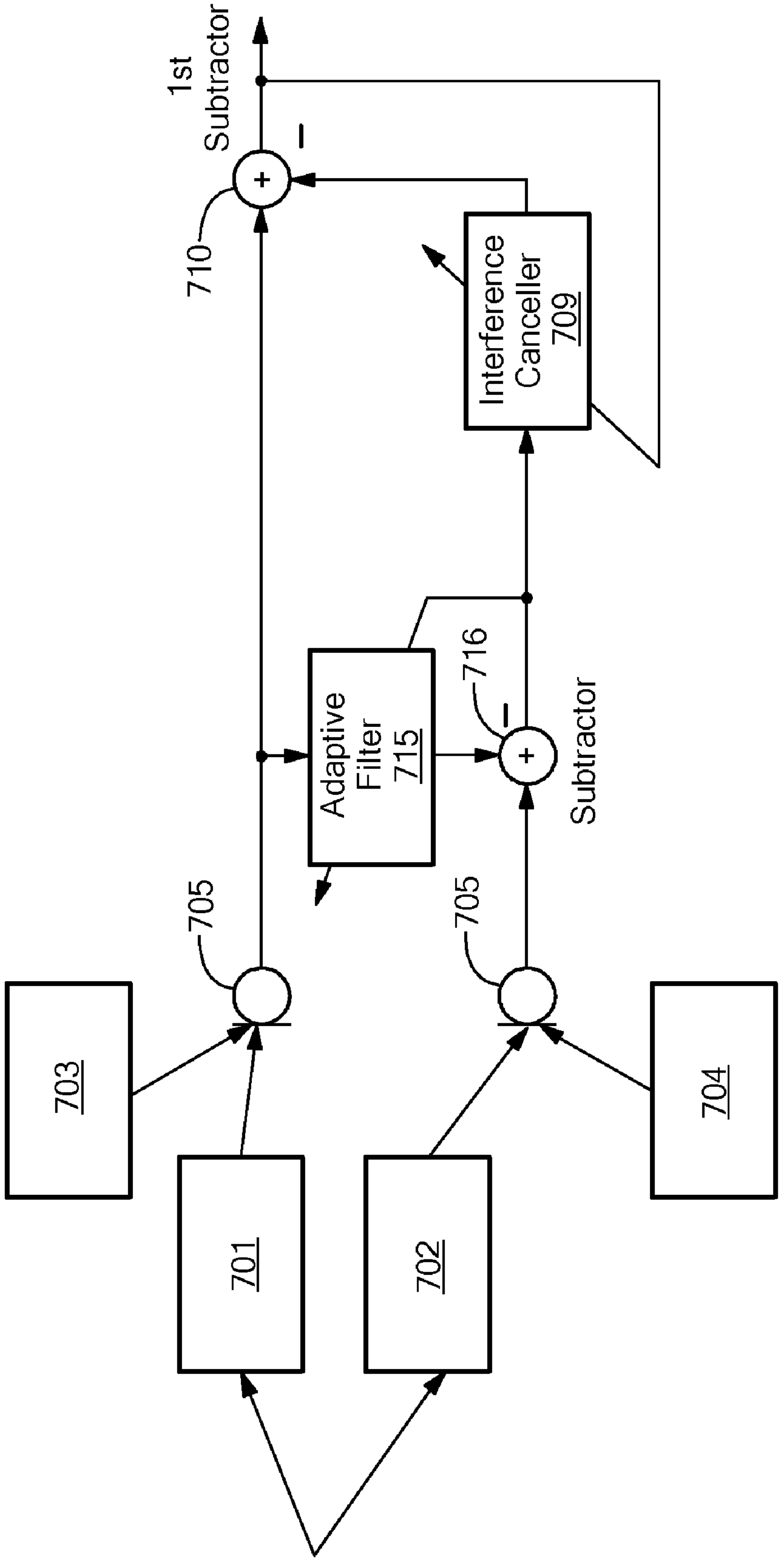
FIG. 7 (PRIOR ART)
FIG. 7 shows a system for noise compensation comprising one adaptive filter for determining a noise reference signal.

Deviations from an idealized sound field may be compensated for by an adaptive blocking matrix which may be realized using adaptive filter. An example for a generalized sidelobe canceller with an adaptive blocking matrix, i.e. with adaptive filter is shown in FIG. 5. In particular, a fixed beamformer 511 is used on a first signal path in order to determine a beamformed signal from a plurality of microphone signals. A subtractor 514 and an interference canceller 513 may be used to compensate for a noise component in the beamformed signal. The interference canceller 513 may use noise reference signals to provide an estimate for the noise component in the beamformed signal. The noise reference signals may be determined using adaptive filter 515.

An adaptive blocking matrix is described in "A robust adaptive beamformer for microphone arrays with a blocking matrix using constrained adaptive filters" by O. Hoshuyama, A. Sugiyama and A. Hirano, in IEEE Transactions on Signal Processing, Vol. 47, No. 10, October 1999, pp. 2677-2684). In the frequency domain, without using constraints, this structure is described in "Computationally efficient frequency-domain robust generalized sidelobe canceller" by W. Herbordt and W. Kellermann, Proc. Int. Workshop on Acoustic Echo and Noise Control (IWAENC-01), Darmstadt, September 2001, pp. 51-55.

Due to constraints for the filter coefficients of the adaptive filter associated with an adaptive blocking matrix, deviations from an idealized sound field may be compensated for only to a certain degree.

Another example for a transfer function is given by a so-called "transfer function GSC", which considers an arbitrary transfer function from the wanted sound source to the microphone signals (see e.g. "Beamforming methods for multi-channel speech enhancement" by S. Gannot et al., Proc. Int. Workshop on Acoustic Echo and Noise Control (IWAENC-99), Pocono Manor Pa., September 1999, pp. 96-99).

In this approach, the transfer functions between a wanted signal originating from a wanted sound source and the microphone signals are being estimated by adaptive filter, i.e. inserted into a blocking matrix:

$$B = \begin{pmatrix} -\frac{G_2(e^{j\Omega})}{G_1(e^{j\Omega})} & 1 & 0 & 0 \\ -\frac{G_3(e^{j\Omega})}{G_1(e^{j\Omega})} & 0 & 1 & 0 \\ -\frac{G_4(e^{j\Omega})}{G_1(e^{j\Omega})} & 0 & 0 & 1 \end{pmatrix}$$

In this way, a first microphone signal is combined with the other microphone signals by subtraction. In particular, the first microphone signal is divided by a transfer function modeling the transfer between the wanted signal and the first microphone signal and multiplied by a transfer function modeling the transfer between the wanted signal and the neighboring channel or microphone signal. This approach is similar to the adaptive blocking matrix, the first audio signal, however, corresponds to a microphone signal in this case, while corresponding to a beamformed signal in the former case.

As such, a blocking matrix comprises an inverse of a first transfer function modeling the transfer between the wanted signal and the first microphone signal, undesired artifacts in the noise reference signal may occur if the first transfer function approaches zero.

As an alternative, systems with distributed microphones are known (see e.g. "Multichannel cross-talk cancellation in a call-center scenario using frequency domain adaptive filtering" by A. Lombard and W. Kellermann, in Proc. Int. Workshop on Acoustic Echo and Noise Control (IWAENC-08), Seattle, September 2008). In this case, it is assumed that a primary microphone receives the wanted signal from the wanted sound source in a more efficient way than the other microphones. A method similar to the one based on an adaptive blocking matrix may be used, wherein the microphone signal of the primary microphone instead of the beamformed signal is used as the first audio signal.

Figure 1:
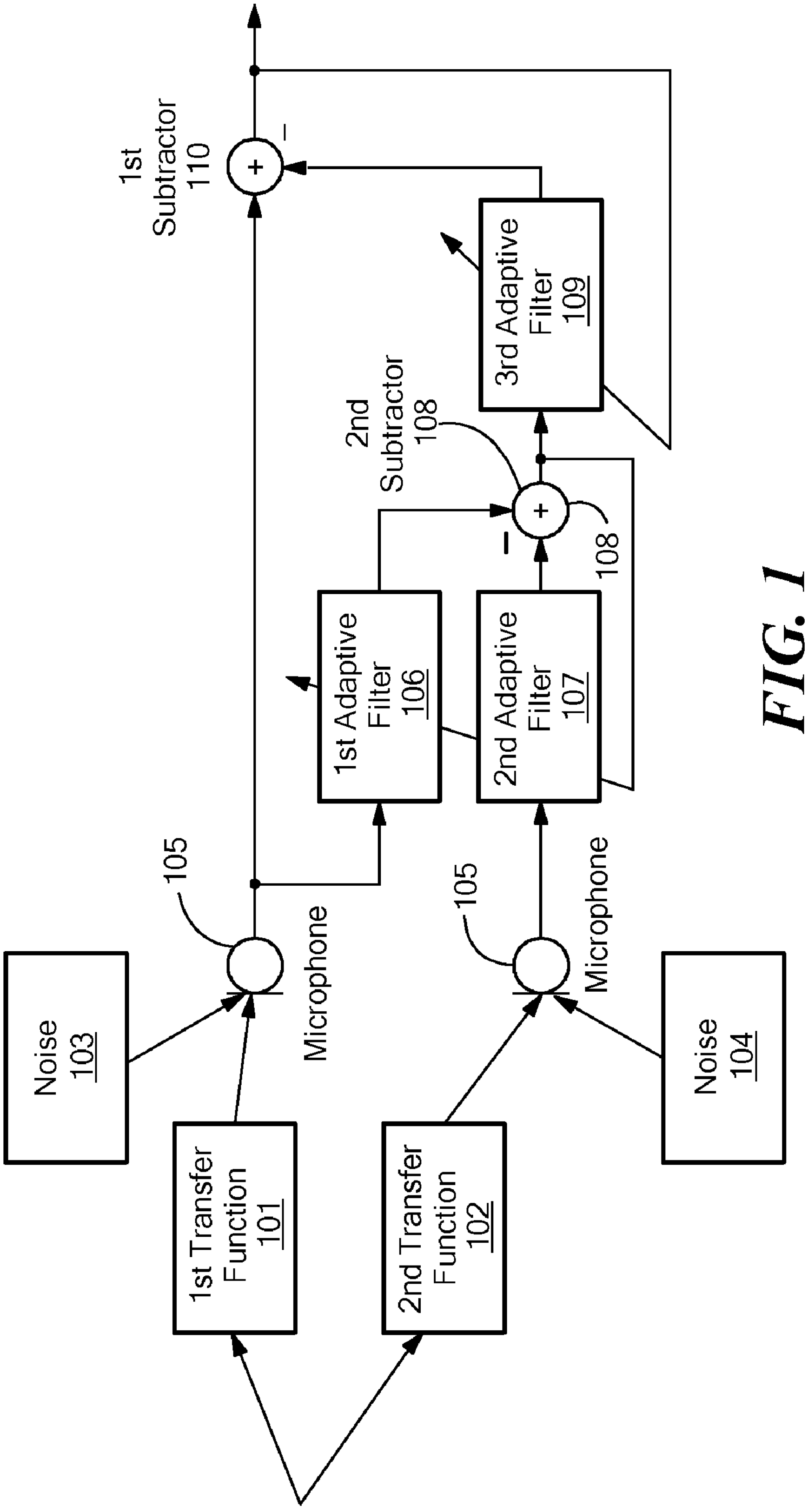
FIG. 1 is shows a system for noise compensation comprising two adaptive filter for determining a noise reference signal.

FIG. 1 shows a system for noise compensation in an audio signal comprising microphones 105. The microphones 105 are configured to detect a wanted signal of a wanted sound source, for example, a speech signal. In particular, a first microphone outputs a first audio signal on a first signal path. The first signal path connects the output of the first microphone with a first subtractor 110. A second microphone 105 outputs a second audio signal on a second signal path. The first signal path branches off to an intermediate signal path comprising a first adaptive filter 106. The first audio signal is used as input for the first adaptive filter 106. The first adaptive filter 106 is used to filter the first audio signal to obtain a first filtered audio signal. The second audio signal on the second signal path is filtered by a second adaptive filter 107 to obtain a second filtered audio signal. The first filtered audio signal and the second filtered audio signal are combined using a second subtractor 108. In particular, the first filtered audio signal may be subtracted from the second filtered audio signal. The output of the subtractor 108 may correspond to a noise reference signal, wherein the first and the second adaptive filter 106 and 107 are adapted such as to minimize a wanted signal component in the noise reference signal.

The noise reference signal is used as input for a third adaptive filter 109 in the second signal path to obtain a filtered noise reference signal. The filtered noise reference signal may correspond to an estimate of the noise component in the first audio signal. The first subtractor 110 may be used to subtract the filtered noise reference signal output by the third adaptive filter 109 from the first audio signal on the first signal path. In other words, the third adaptive filter 109 may be adapted such as to minimize the noise component in the first audio signal. In this way, the subtractor 110 yield an output signal with reduced noise.

The first audio signal may comprise a wanted signal component, wherein the wanted signal component is associated with a wanted signal originating from a wanted sound source. A first transfer function 101 may model the transfer between the wanted signal and the first signal path, in particular the wanted signal component of the first audio signal on the first signal path. The first audio signal may comprise a noise component 103 originating from one or more noise sources. Similarly, the second audio signal may comprise a wanted signal component associated with the wanted signal, in particular the wanted signal associated with the wanted signal component of the first audio signal. A second transfer function 102 may model the transfer between the wanted signal and the second signal path. The second audio signal may further comprise a noise component 104. The first and the second adaptive filter 106 and 107 may be adapted such as to minimize a wanted signal component in the noise reference signal, in particular according to a predetermined criterion.

The adapted filter coefficients of the first and the second adaptive filter 106 and 107 may model the transfer function of the first and the second adaptive filter 106 and 107, respectively, which may read:

$$H_1(e^{j}\Omega)=G_2(e^{j\Omega})\cdot\tilde{G}(e^{j\Omega})$$

$$H_2(e^{j\Omega})=G_1(e^{j\Omega})\cdot\tilde{G}(e^{j\Omega}),$$

wherein $\tilde{G}$ denotes an arbitrary or predetermined transfer function. In other words, the solution for the transfer function of the first and second adaptive filter may not be unique. The predetermined or arbitrary transfer function may be constant, in particular, the arbitrary or predetermined transfer function may take a constant value of $\tilde{G}=1$. In this case, the first adaptive filter models the second transfer function and the second adaptive filter models the first transfer function, i.e. the transfer function of the adjacent signal path or channel.

Figure 2:
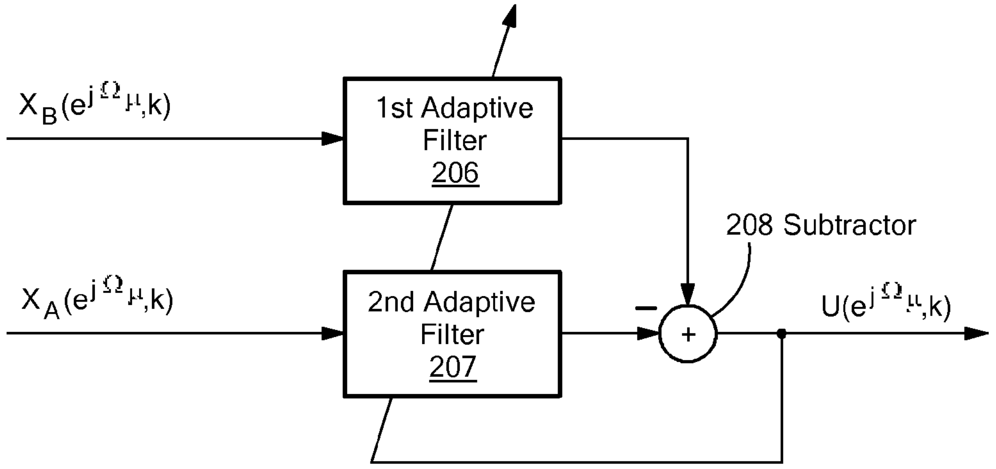
FIG. 2 shows a system for determining a noise reference signal comprising two adaptive filter.

FIG. 2 shows a system for determining a noise reference signal comprising a first adaptive filter 206 and a second adaptive filter 207. The two adaptive filter may correspond to adaptive finite impulse response (FIR) filters. An output signal of the first adaptive filter 206, i.e. a first filtered audio signal, may be combined with an output signal of the second adaptive filter 207, i.e. a second filtered audio signal, using a subtractor 208 to obtain a noise reference signal. The filter coefficients modeling the transfer function of the first and second adaptive filter 206 and 207, respectively, may read:

$$H_A(e^{j\Omega_\mu},l,k), \text{ and}$$

$$H_B(e^{j\Omega_\mu},p,k),$$

wherein l denotes the filter order variable of the second adaptive filter 207, with l=0, . . . , L−1, and p denotes the filter order variable of the first adaptive filter 206, with p=0, . . . , P−1, with L and P denoting the filter order of the first and second adaptive filter. Here and below, $\Omega_\mu$ denotes the μ-th sub-band, in particular frequency nodes of the μ-th sub-band.

The filter coefficients may be written as a vector, i.e.

$$H_A(e^{j\Omega_\mu},k)=[H_A(e^{j\Omega_\mu},0,k), \ldots , H_A(e^{j\Omega_\mu},L-1,k)]^T, \text{ and}$$

$$H_B(e^{j\Omega_\mu},k)=[H_B(e^{j\Omega_\mu},0,k), \ldots , H_B(e^{j\Omega_\mu},P-1,k)]^T.$$

In this case L and P denote the filter order of the adaptive filter, k corresponds to a time variable and the operator denoted by T corresponds to a transposition operator. The first and the second adaptive filter may be used to filter a first and a second audio signal, wherein the first audio signal is denoted by $X_B(e^{j\Omega_\mu},k)$ and the second audio signal is denoted by $X_A(e^{j\Omega_\mu},k)$. A noise reference signal, $U(e^{j\Omega_\mu},k)$, may be determined as:

$$U(e^{j\Omega_\mu}, k) = \sum_{l=0}^{L-1} H_A^*(e^{j\Omega_\mu}, l, k)\cdot X_A(e^{j\Omega_\mu}, k-l) - \sum_{p=0}^{P-1} H_B^*(e^{j\Omega_\mu}, p, k)\cdot X_B(e^{j\Omega_\mu}, k-p).$$

Here the operator * denotes a complex conjugation. The first and the second audio signal may correspond to microphone signals. In particular, in an array comprising M microphones, two arbitrary microphone signals may be used to determine a noise reference signal, i.e.

$$X_A(e^{j\Omega_\mu},k):=X_m(e^{j\Omega_\mu},k), \text{ and}$$

$$X_B(e^{j\Omega_\mu},k):=X_n(e^{j\Omega_\mu},k),$$

With m≠n, denoting microphone m and n, respectively, in particular with m, n∈{1, . . . , M}.

Alternatively, the first or the second audio signal may correspond to an output signal of a beamformer, i.e. to a beamformed signal. The beamformed signal may be determined by a beamformer based on microphone signals from a microphone array. For determining the noise reference signal the beamformed signal may be used as a first audio signal, while the second audio signal may be an arbitrary microphone signal from the microphone array, i.e.

$$X_A(e^{j\Omega_\mu},k):=X_m(e^{j\Omega_\mu},k), \text{ and}$$

$$X_B(e^{j\Omega_\mu},k):=X_{FBF}(e^{j\Omega_\mu},k),$$

where $X_{FBF}$ denotes a beamformed signal stemming from a fixed beamformer and m denotes a predetermined or arbitrary microphone from the microphone array.

Figure 3:
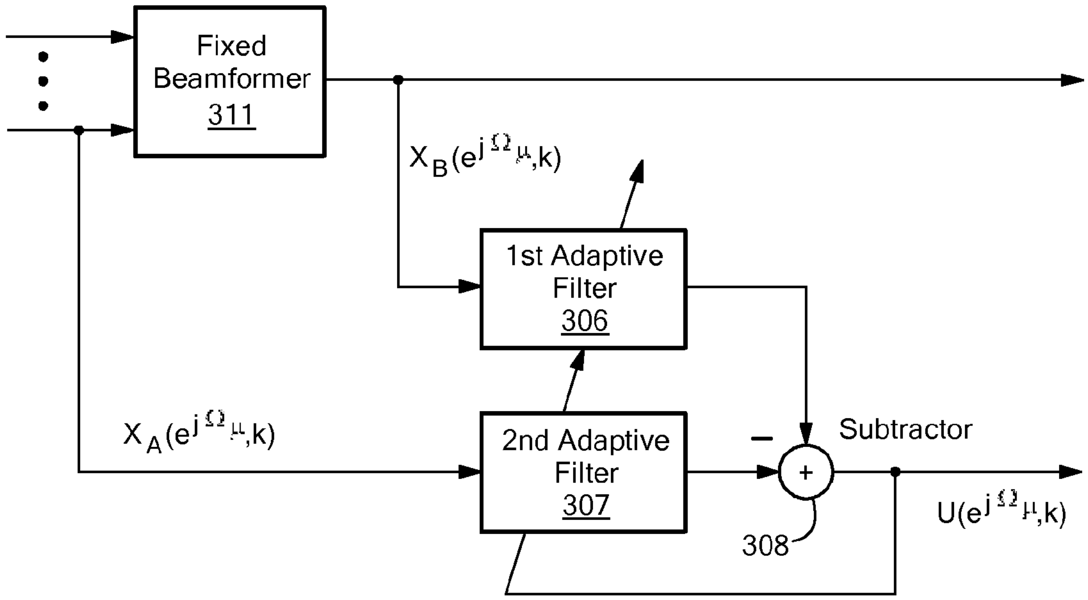
FIG. 3 shows a system for determining a noise reference signal comprising two adaptive filter and a beamformer.

Such a system is shown in FIG. 3 comprising a fixed beamformer 311, a first adaptive filter 306, a second adaptive filter 307 and a subtractor 308, configured to combine the first filtered audio signal and the second filtered audio signal to yield a noise reference signal, U.

The noise reference signal may be determined for a particular time, e.g. denoted by k. The first audio signal and the second audio signal may cover a predetermined time period.

A noise reference signal may be determined repeatedly, in particular for different audio signals or for audio signals associated with different time periods and/or sub-bands.

The filter coefficients of the adaptive filter may be updated or modified. In this way, the first and second adaptive filter may be adapted for a subsequent time.

Adapting the first and the second adaptive filter may be based on a predetermined criterion, in particular, on a predetermined optimization criterion. This adaptation may comprise a gradient descent method, also known as steepest descent or method of steepest descent.

In this way, updated or modified filter coefficients may be obtained, i.e.

$$H_A(e^{j\Omega_\mu},l,k)\rightarrow\tilde{H}_A(e^{j\Omega_\mu},l,k+1),$$

$$H_B(e^{j\Omega_\mu},p,k)\rightarrow\tilde{H}_B(e^{j\Omega_\mu},p,k+1).$$

The modified coefficients may be normalized using a predetermined normalization factor, i.e.

$$\tilde{H}_A(e^{j\Omega_\mu},l,k+1)\rightarrow H_A(e^{j\Omega_\mu},l,k+1),$$

$$\tilde{H}_B(e^{j\Omega_\mu},p,k+1)\rightarrow H_B(e^{j\Omega_\mu},p,k+1).$$

Adapting the first and the second adaptive filter may be performed after the steps of filtering the first and the second audio signal.

In particular, adapting the first and the second adaptive filter may be based on the normalized least mean square algorithm (NLMS, see e.g. "A sub-band based acoustic source localization system for reverberant environments" by T. Wolff, M. Buck and G. Schmidt, in Proc. ITG-Fachtagung Sprachkommunikation, Aachen, October 2008). The normalized least mean square method is computationally efficient and robust. This algorithm may read:

$$\tilde{H}_A(e^{j\Omega_\mu},l,k+1) = H_A(e^{j\Omega_\mu},l,k)-\beta(e^{j\Omega_\mu},k)\frac{X_A(e^{j\Omega_\mu},k-l)U*(e^{j\Omega_\mu},k)}{P_X(e^{j\Omega_\mu},k)},$$

$$\tilde{H}_B(e^{j\Omega_\mu},p,k+1) = H_B(e^{j\Omega_\mu},p,k)-\beta(e^{j\Omega_\mu},k)\frac{X_B(e^{j\Omega_\mu},k-p)U*(e^{j\Omega_\mu},k)}{P_X(e^{j\Omega_\mu},k)}$$

wherein β denotes a free parameter, in particular corresponding to an adaption increment or adaptation step size. This parameter may be determined or chosen from a predetermined range, in particular between 0 and 1, for example 0.5. While the wanted sound source is inactive, i.e. if the first and the second audio signal do not comprise a wanted signal component, the parameter β may be chosen equal to zero. The adaptation terms comprise the power or power density of the first and the second audio signal in the denominator, which reads:

$$P_X(e^{j\Omega_\mu},k)=\sum_{1=0}^{L-1}|X_A(e^{j\Omega_\mu},k-l)|^2+\sum_{p=0}^{P-1}|X_B(e^{j\Omega_\mu},k-p)|^2.$$

Alternatively, the predetermined criterion for adapting the first and the second adaptive filter may be based on optimizing, in particular minimizing, the signal-to-noise ratio of the noise reference signal. In this case, a filter coefficient vector may be defined as:

$$\vec{H}(e^{j\Omega_\mu},k)=\begin{bmatrix} H_A(e^{j\Omega_\mu},0,k),\ \ldots\ , \\ H_A(e^{j\Omega_\mu},L-1,k), \\ H_B(e^{j\Omega_\mu},0,k),\ \ldots\ , \\ H_B(e^{j\Omega_\mu},P-1,k) \end{bmatrix}^T$$

and an audio signal vector may be defined as:

$$\vec{X}(e^{j\Omega_\mu},k)=\begin{bmatrix} X_A(e^{j\Omega_\mu},k), \\ X_A(e^{j\Omega_\mu},k-1),\ \ldots\ , \\ X_A(e^{j\Omega_\mu},k-L+1),\ \ldots \\ \ldots\ , \\ X_B(e^{j\Omega_\mu},k),\ \ldots\ , \\ X_B(e^{j\Omega_\mu},k-P+1) \end{bmatrix}^T.$$

The filter coefficient vector and the audio signal vector may be augmented by further audio signals, $X_c$, and further filter coefficients, $H_c$, for further adaptive filter, respectively, with c∈{C, D, . . . }. In this case, the combination of the filtered audio signals to obtain noise reference signals, may be determined by the sign of the filter coefficients.

A noise reference signal, U, may be determined as $$U(e^{j\Omega_\mu},k)=\vec{H}^H(e^{j\Omega_\mu},k)\vec{X}(e^{j\Omega_\mu},k).$$

From the audio signal vector, a power density matrix, in particular a power spectral density matrix, may be determined, i.e.

$$\Phi_{XX}(e^{j\Omega_\mu},k)=E\{\vec{X}(e^{j\Omega_\mu},k)\vec{X}^H(e^{j\Omega_\mu},k)\}.$$

where the operator E{ . . . } denotes an expectation value and the operator H denotes an Hermitian transpose (i.e. complex conjugate transpose).

In this way, the power spectral density of the noise reference signal may be written as $$\phi_{uu}(e^{j\Omega_\mu},k)=E\{U(e^{j\Omega_\mu},k)U*(e^{j\Omega_\mu},k)\}$$

-continued $$= \vec{H}^H(e^{j\Omega_\mu}, k)\Phi_{XX}(e^{j\Omega_\mu}, k)\vec{H}(e^{j\Omega_\mu}, k).$$

The first and the second audio signal may comprise a wanted signal component and a noise component, i.e. the audio signal vector may correspond to a sum of a wanted signal vector and a noise vector, i.e.

$$\vec{X}(e^{j\Omega_\mu}, k) = \vec{S}(e^{j\Omega_\mu}, k) + \vec{N}(e^{j\Omega_\mu}, k).$$

The wanted signal component and the noise component may be statistically independent. Consequently, the power spectral density matrix of the audio signal vector may read:

$$\Phi_{XX}(e^{j\Omega_\mu},k)=\Phi_{SS}(e^{j\Omega_\mu},k)+\Phi_{nn}(e^{j\Omega_\mu},k).$$

The method may comprise detecting whether the wanted sound source is active, i.e. whether the first and the second audio signal comprise a wanted signal component. In particular, the power or power density of the noise component, i.e. of the noise vector, may be estimated during the wanted sound source is inactive, i.e. if the wanted signal component or vector is equal to zero $$\left(\vec{S}(e^{j\Omega_\mu}, k) = 0\right).$$

Then the power spectral density matrix of the noise vector reads:

$$\Phi_{nn}(e^{j\Omega_\mu}, k) = E\left\{\vec{N}(e^{j\Omega_\mu}, k)\vec{N}^H(e^{j\Omega_\mu}, k)\right\}.$$

A mean power or mean power spectral density of the noise component, in particular of the first and second audio signal or of the noise vector, may be estimated as $$\phi_{nn}(e^{j\Omega_\mu}, k) = \frac{1}{M}\text{trace}\{\Phi_{nn}(e^{j\Omega_\mu}, k)\}.$$

Here the operator trace { . . . } denotes the trace operator, i.e. the sum of the elements on the main diagonal of a square matrix. The power or power density of the wanted signal component and the noise component in the noise reference signal, $\phi_{u_s u_s}$ and $\phi_{u_n u_n}$, respectively, may read:

$$\phi_{u_s u_s}(e^{j\Omega_\mu}, k) = \vec{H}^H(e^{j\Omega_\mu}, k)\Phi_{ss}(e^{j\Omega_\mu}, k)\vec{H}(e^{j\Omega_\mu}, k)$$

$$\phi_{u_n u_n}(e^{j\Omega_\mu}, k) = \vec{H}^H(e^{j\Omega_\mu}, k)\Phi_{nn}(e^{j\Omega_\mu}, k)\vec{H}(e^{j\Omega_\mu}, k).$$

In this way, the signal-to-noise ratio (SNR) of the noise reference signal may read $$SNR(e^{j\Omega_\mu}, k) = \frac{\phi_{u_s u_s}}{\phi_{u_n u_n}} = \frac{\vec{H}^H(e^{j\Omega_\mu}, k)\Phi_{XX}(e^{j\Omega_\mu}, k)\vec{H}(e^{j\Omega_\mu}, k)}{\vec{H}^H(e^{j\Omega_\mu}, k)\Phi_{nn}(e^{j\Omega_\mu}, k)\vec{H}(e^{j\Omega_\mu}, k)} - 1$$

The signal-to-noise ratio may be minimized, i.e. the power or power density of the wanted signal component in the noise reference signal may be minimized. Hence the predetermined criterion for the adapted first and second adaptive filter or for adapting the first and the second adaptive filter may read:

$$\min_{\vec{H}(e^{j\Omega_\mu},k)}\left\{\frac{\vec{H}^H(e^{j\Omega_\mu}, k)\Phi_{XX}(e^{j\Omega_\mu}, k)\vec{H}(e^{j\Omega_\mu}, k)}{\vec{H}^H(e^{j\Omega_\mu}, k)\Phi_{nn}(e^{j\Omega_\mu}, k)\vec{H}(e^{j\Omega_\mu}, k)} - 1\right\}$$

The optimization may comprise the constraint $$\vec{H}^H(e^{j\Omega_\mu}, k)\Phi_{nn}(e^{j\Omega_\mu}, k)\vec{H}(e^{j\Omega_\mu}, k) = \phi_{nn}(e^{j\Omega_\mu}, k).$$

According to this constraint, the power of the noise component in the noise reference signal is set equal to the mean power of the noise component in the first and the second audio signal. Such a constraint is particularly useful when minimizing a wanted signal component in the noise reference signal.

The algorithm for adapting the first and the second adaptive filter may be based on a gradient decent method and a Lagrangian method, i.e. based on Lagrange multipliers, (see e.g. "Adaptive Filter-and-Sum Beamforming in Spatially Correlated Noise" by E. Warsitz and R. Häb-Umbach, in Proc. Int. Workshop on Acoustic Echo and Noise Control (IWAENC-05), Eindhoven, 2005, pp. 125-128).

The algorithm may read:

$$\vec{H}(k+1) = \vec{H}(k) + \left(\frac{\phi_{nn}(k) -}{\vec{H}^H(k)\Phi_{nn}(k)\vec{H}(k)}\right)\vec{V}(k) - \mu(k)\begin{bmatrix}\Phi_{XX}(k)\vec{H}(k) - \\ \vec{H}^H(k)\Theta(k) \\ \vec{H}(k)\vec{V}(k)\end{bmatrix}$$

with $$\vec{V}(k) = \frac{\Phi_{nn}(k)\vec{H}(k)}{2\vec{H}^H(k)\Phi_{nn}(k)\Phi_{nn}(k)\vec{H}(k)}$$

and $$\Theta(k)=\Phi_{XX}(k)\Phi_{nn}(k)+\Phi_{nn}(k)\Phi_{XX}(k)$$

and the normalized adaptation step size or adaptation increment $$\mu(k)=\alpha(k)\overline{P}_x(k).$$

The adaptation step size $\alpha(k)$ may take a positive value if the wanted sound source is active, in particular between 0 and 1, for example 0.5, while if the wanted sound source is inactive, i.e. if the audio signals comprise no wanted signal component, the adaptation increment, $\alpha(k)$, may be zero. $\overline{P}_x(k)$ denotes a (temporally) smoothed power or power density of the first and the second audio signal or of the audio signal vector. The frequency dependency of all the terms in the algorithm was not explicitly noted to improve legibility.

The sign of $\mu(k)$ may be chosen such as to yield a minimization of the signal-to-noise ratio.

As the transfer function of the first and the second adaptive filter is not unique, an attenuation of the amplitude of the filter coefficients may occur. In order to avoid such an attenuation, the modified filter coefficients may be normalized. In other words, the adaptation may be further based on a predetermined normalization factor, $\eta(e^{j\Omega_\mu},k)$, i.e.

$$H_A(e^{j\Omega_\mu},l,k)=\tilde{H}_A(e^{j\Omega_\mu},l,k)\cdot\eta^{-1}(e^{j\Omega_\mu},k), \text{ and}$$

$$H_B(e^{j\Omega_\mu},p,k)=\tilde{H}_B(e^{j\Omega_\mu},p,k)\cdot\eta^{-1}(e^{j\Omega_\mu},k).$$

For the choice of the predetermined normalization factor, several alternatives are possible.

For example, the predetermined normalization factor may correspond to the norm of a modified filter coefficient vector, i.e.

$$\eta(e^{j\Omega_\mu},k)=\sqrt{\sum_{l=0}^{L-1}\left|\tilde{H}_A(e^{j\Omega_\mu},l,k)\right|^2+\sum_{p=0}^{P-1}\left|\tilde{H}_B(e^{j\Omega_\mu},p,k)\right|^2}.$$

Alternatively, the maximum value of the absolute values of the modified filter coefficients may be used, i.e.

$$\eta(e^{j\Omega_\mu},k)=\max\{|\tilde{H}_A(e^{j\Omega_\mu},0,k)|,\ldots,|\tilde{H}_A(e^{j\Omega_\mu},L-1,k)|,\ |\tilde{H}_B(e^{j\Omega_\mu}0,k)|,\ldots,|\tilde{H}_B(e^{j\Omega_\mu},P-1,k)|\}.$$

Alternatively, the absolute value of a predetermined modified filter coefficient may be used, i.e.

$$\eta(e^{j\Omega_\mu},k)=|\tilde{H}_{c_0}(e^{j\Omega_\mu},i_0,k)|$$

wherein the index $c_0$ indicates the first or the second audio signal and the index $i_0$ indicates the value of the filter order variable of the predetermined filter coefficient. In this case the predetermined normalization factor is real valued.

A complex valued predetermined normalization factor may be determined from a particular or predetermined modified filter coefficient, i.e.

$$\eta(e^{j\Omega_\mu},k)=\tilde{H}_{c_0}(e^{j\Omega_\mu},i_{0,k}).$$

By using a complex valued predetermined normalization factor, a phase correction can be performed as well.

Particularly for a system as shown in FIG. 3, it may be useful to use a predetermined modified filter coefficient from the first adaptive filter as predetermined normalization factor, in particular with the index $i_0=0$. In FIG. 3, the first audio signal corresponds to an output signal of the beamformer 311, i.e. a beamformed signal. The second audio signal corresponds to a microphone signal from one of the M microphones of the microphone array. A noise reference signal may be determined for each of the M microphones of the microphone array in combination with the beamformed signal. A complex valued predetermined normalization factor based on a modified filter coefficient $\tilde{H}_B(e^{j\Omega_\mu},i_0,k)$ corresponding to $H_B(e^{j\Omega_\mu},i_0,k)=1$, may be advantageous as in this case the component $X_{FBF}(e^{j\Omega_\mu},k-i_0)$ of the signal vector is not altered or modified by the first adaptive filter, and therefore is the same in all noise reference signals of the microphone array. As a consequence, the M noise reference signals of the microphone array are related to each other and may be compared to each other in terms of amplitude and phase differences. In the case where the predetermined normalization factor is based on a filter coefficient $H_A(e^{j\Omega_\mu},i_0,k)$ of the second adaptive filter this might not be the case, as then different components $X_m(e^{j\Omega_\mu},k-i_0)$ of the signal vector would be multiplied with the normalized filter coefficients.

The predetermined normalization factor may be based on the power or power density of the noise component of a beamformed signal, wherein the beamformed signal may correspond to the first or the second audio signal. In particular, the predetermined normalization factor may be proportional to the ratio between the power or power density of the noise component in the beamformed signal, i.e. at the output of the beamformer, and the power or power density of the noise component in the noise reference signal, for example, $$\eta(e^{j\Omega_\mu},k)=\sqrt{\frac{\phi_{vv}(e^{j\Omega_\mu},k)}{\phi_{u_nu_n}(e^{j\Omega_\mu},k)}}.$$

Here $\phi_{vv}(e^{j\Omega_\mu},k)$ denotes the power or power density of the noise component in the beamformed signal and $\phi_{u_nu_n}(e^{j\Omega_\mu},k)$ denotes the power or power density of the noise component in the noise reference signal. The power density or the power of the beamformed signal, i.e. the output signal of the beamformer, may be directly compared to the power density or power of the blocking signal. In this way, activity of the wanted sound source may be detected.

If adapting the first and the second adaptive filter is based on a minimization of the signal-to-noise ratio of the noise reference signal, a normalization of the filter coefficients may be omitted, as the constraint under which the minimization has been performed, may comprise an implicit normalization.

Figure 8:
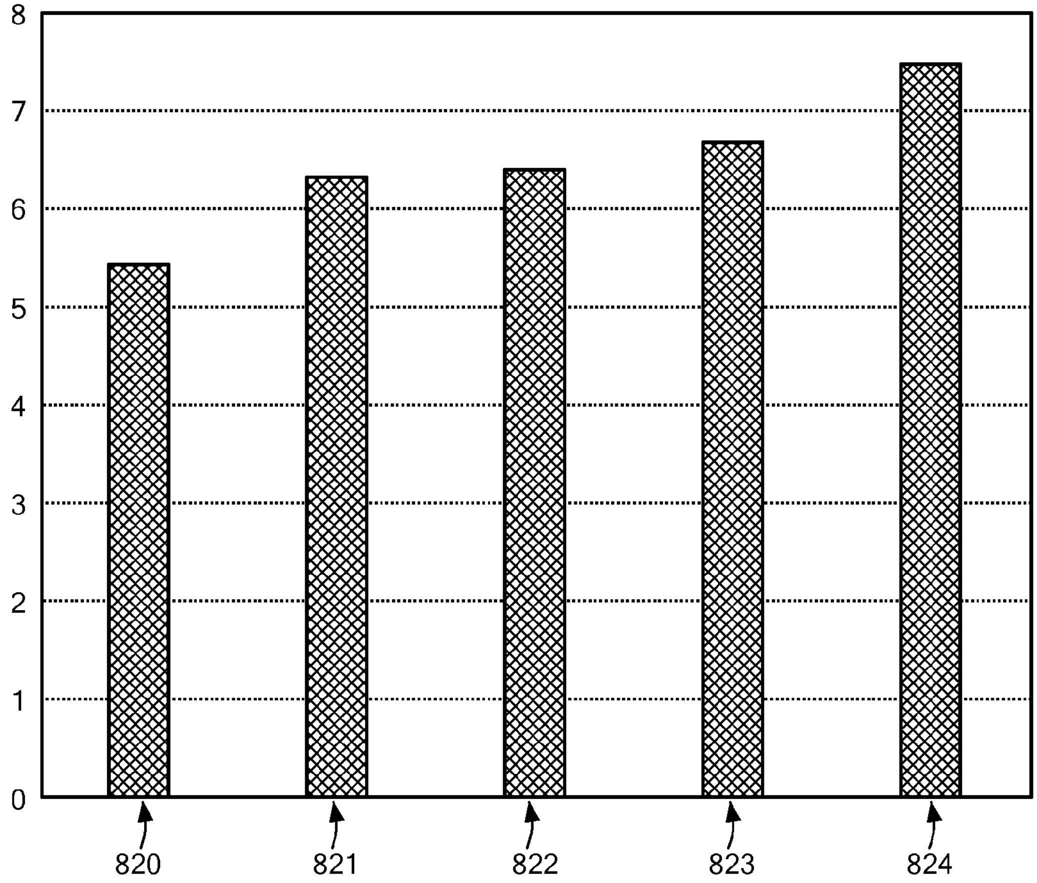
FIG. 8 shows the mean reduction of the wanted signal component in the noise reference signal in different systems for noise compensation.

FIG. 8 shows the mean attenuation of the wanted signal component in the noise reference signal for different methods for determining the noise reference signal. In particular, a microphone array comprising two microphones was used to detect a wanted sound signal in a conference room. The filter order or filter length of the adaptive filter has been chosen to be 1. The determination of the noise reference signals was performed in a sub-band domain. In particular, time dependent audio signals were sampled with a sampling frequency of 11025 Hz and processed into 256 sub-bands.

Figure 9:
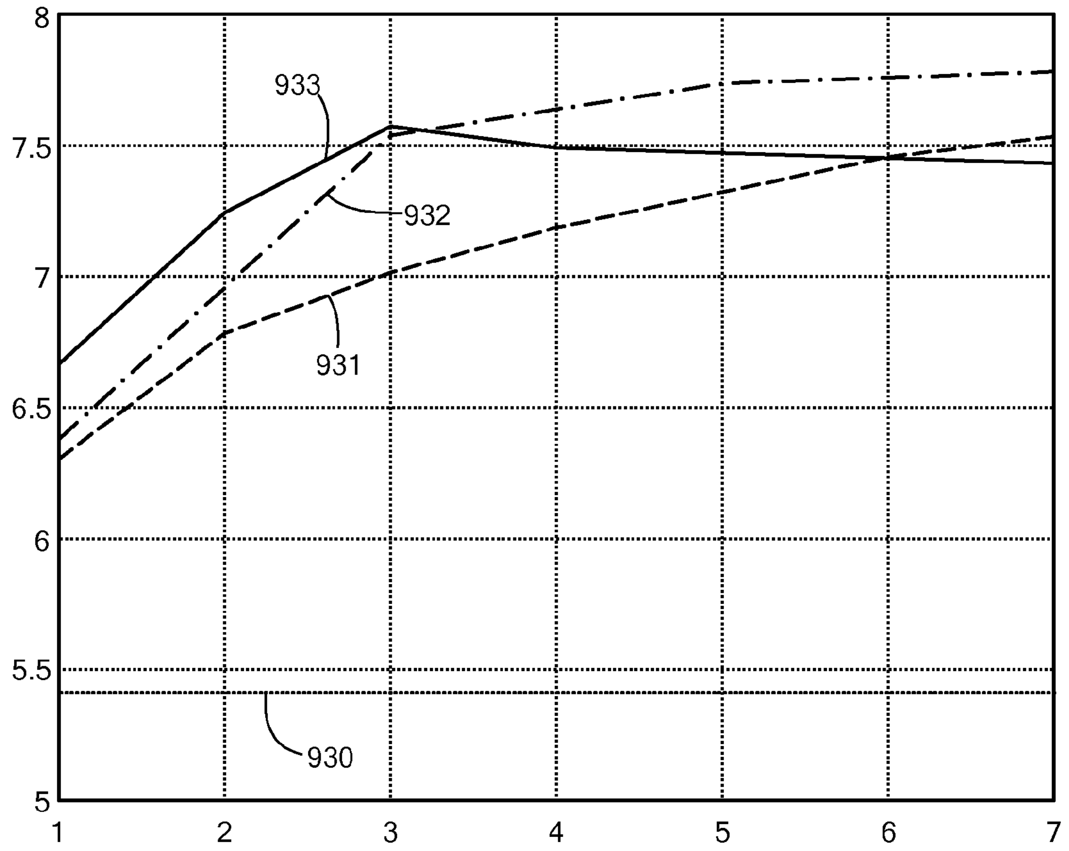
FIG. 9 shows the mean reduction of the wanted signal component in the noise reference signal as a function of the filter order of the employed adaptive filter.

The direction to the wanted sound source, in particular the direction of arrival of a wanted signal originating from the wanted sound source, was perpendicular to the axis of the microphone array, i.e. a "broadside" arrangement was used. The decrease of the signal-to-noise ratio from the first and the second audio signal to the noise reference signal was determined. This decrease is shown on the ordinate of FIG. 8, in particular as mean of the power attenuation (in dB), for a system using a fixed blocking matrix 820, i.e. B=[1,−1], a system using an adaptive blocking matrix 821, a system as shown in FIG. 2, 822, a system as shown in FIG. 3, 823, and a system wherein the first and the second adaptive filter have been adapted based on a minimization of the signal-to-noise ratio 824. The best blocking of the wanted signal component can be found for the signal-to-noise ratio minimization method 824. In FIG. 9, the same quantity is shown for different filter orders of the adaptive filter. In particular, the abscissa, i.e. the x-axis, shows the filter order of the applied adaptive filter. The dotted line 930 corresponds to a system using a fixed blocking matrix. In this case, no adaptive filter are used. The dashed line 931 corresponds to a system using an adaptive blocking matrix. The dash-dotted line 932 corresponds to a system as shown in FIG. 2 and the solid line 933 corresponds to a system as shown in FIG. 3.

A method for determining a noise reference signal, i.e. a signal where the wanted signal component is minimized or blocked, as described above, may be used for noise compensation, in particular in a "general sidelobe canceller" structure. The determined noise reference signal may also be used for post filtering of an audio signal, in particular for noise reduction. Another application of a noise reference signal can be found in the field of speech recognition or in the field of adaptation control. By comparing the noise reference signal to other signals such as a beamformed signal, the activity of a wanted sound source may be detected. Such information on the activity of a wanted sound source may be used, for example, to control an adaptation process of an adaptive filter.

In a hands-free system with distributed microphones, a noise reference signal may be used to avoid disturbances in the speech signal by concurrently speaking users.

Although previously discussed embodiments of the present invention have been described separately, it is to be understood that some or all of the above-described features can also be combined in different ways. The discussed embodiments are not intended as limitations but serve as examples illustrating features and advantages of the invention.

The embodiments of the invention described above are intended to be merely exemplary; numerous variations and modifications will be apparent to those skilled in the art. All such variations and modifications are intended to be within the scope of the present invention as defined in any appended claims.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an embodiment of the present invention, predominantly all of the reordering logic may be implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

We claim:

1. A computer implemented method for determining a noise reference signal for noise compensation, comprising:

in a first computer process, receiving a first audio signal on a first signal path and a second audio signal on a second signal path;

in a second computer process, filtering the first audio signal using a first adaptive filter to obtain a first filtered audio signal;

in a third computer process, filtering the second audio signal using a second adaptive filter to obtain a second filtered audio signal; and in a fourth computer process, combining the first and the second filtered audio signal to obtain the noise reference signal;

wherein the first and the second adaptive filter are adapted such as to minimize a wanted signal component in the noise reference signal;

wherein a first transfer function models a transfer from a wanted signal originating from a wanted sound source to the first signal path and a second transfer function models a transfer from the wanted signal originating from the wanted sound source to the second signal path, and wherein the transfer function of the first adaptive filter is based on the second transfer function and wherein the transfer function of the second adaptive filter is based on the first transfer function.

2. The computer implemented method according to claim 1, further comprising:

in a computer process, adapting the first and the second adaptive filter.

3. The computer implemented method according to claim 2, wherein adapting the first and the second adaptive filter is based on a normalized least mean square method.

4. The computer implemented method according to claim 3, wherein the normalized least mean square method comprises modifying a set of filter coefficients of the first and/or second adaptive filter based on the power or power density of the first and second audio signal.

5. The computer implemented method according to claim 2 wherein adapting the first and second adaptive filter is based on a minimization of the signal-to-noise ratio of the noise reference signal.

6. The computer implemented method according to claim 5, wherein the method based on the minimization of the signal-to-noise ratio comprises determining a power or power density of the first and the second audio signal.

7. The computer implemented method according to claim 5, wherein the method based on the minimization of the signal-to-noise ratio comprises determining a power or power density of the noise component of the first and second audio signal.

8. The computer implemented method according to claim 5, wherein minimizing the signal-to-noise ratio of the noise reference signal is based on the power or power density of the first and the second audio signal and on the power or power density of the noise component of the first and second audio signal.

9. A computer implemented method for determining a noise reference signal for noise compensation, comprising:

in a first computer process, receiving a first audio signal on a first signal path and a second audio signal on a second signal path;

in a second computer process, filtering the first audio signal using a first adaptive filter to obtain a first filtered audio signal;

in a third computer process, filtering the second audio signal using a second adaptive filter to obtain a second filtered audio signal; and in a fourth computer process, combining the first and the second filtered audio signal to obtain the noise reference signal;

wherein the first and the second adaptive filter are adapted such as to minimize a wanted signal component in the noise reference signal;

in a computer process, adapting the first and the second adaptive filters based on a normalized least mean square method wherein the normalized least mean square method comprises modifying a set of filter coefficients of the first and/or second adaptive filter based on the noise reference signal.

10. A computer implemented method for determining a noise reference signal for noise compensation, comprising:

in a first computer process, receiving a first audio signal on a first signal path and a second audio signal on a second signal path;

in a second computer process, filtering the first audio signal using a first adaptive filter to obtain a first filtered audio signal;

in a third computer process, filtering the second audio signal using a second adaptive filter to obtain a second filtered audio signal; and in a fourth computer process, combining the first and the second filtered audio signal to obtain the noise reference signal;

wherein the first and the second adaptive filter are adapted such as to minimize a wanted signal component in the noise reference signal;

in a computer process, adapting the first and the second adaptive filter wherein adapting the first and the second adaptive filter comprises normalizing modified filter coefficients of the first and/or second adaptive filter using a predetermined normalization factor.

11. The computer implemented method according to claim 10, wherein the predetermined normalization factor is based on one or more filter coefficients or on one or more modified filter coefficients of the first and/or second adaptive filter.

12. A computer implemented method for determining a noise reference signal for noise compensation, comprising:

in a first computer process, receiving a first audio signal on a first signal path and a second audio signal on a second signal path;

in a second computer process, filtering the first audio signal using a first adaptive filter to obtain a first filtered audio signal;

in a third computer process, filtering the second audio signal using a second adaptive filter to obtain a second filtered audio signal; and in a fourth computer process, combining the first and the second filtered audio signal to obtain the noise reference signal;

wherein the first and the second adaptive filter are adapted such as to minimize a wanted signal component in the noise reference signal wherein the first and the second audio signal each are a beamformed signal, emanating from different beamformers.

13. A computer implemented method for determining a noise reference signal for noise compensation, comprising:

in a first computer process, receiving a first audio signal on a first signal path and a second audio signal on a second signal path;

in a second computer process, filtering the first audio signal using a first adaptive filter to obtain a first filtered audio signal;

in a third computer process, filtering the second audio signal using a second adaptive filter to obtain a second filtered audio signal; and in a fourth computer process, combining the first and the second filtered audio signal to obtain the noise reference signal;

wherein the first and the second adaptive filter are adapted such as to minimize a wanted signal component in the noise reference signal wherein combining the first and the second filtered audio signal comprises subtracting the first filtered audio signal from the second filtered audio signal.

14. A computer implemented method for processing an audio signal for noise compensation, comprising:

in a first computer process, receiving a first audio signal on a first signal path and a second audio signal on a second signal path;

in a second computer process, filtering the first audio signal using a first adaptive filter to obtain a first filtered audio signal;

in a third computer process, filtering the second audio signal using a second adaptive filter to obtain a second filtered audio signal; and in a fourth computer process, combining the first and the second filtered audio signal to obtain the noise reference signal;

wherein the first and the second adaptive filter are adapted such as to minimize a wanted signal component in the noise reference signal;

filtering the noise reference signal on the second signal path using a third adaptive filter to obtain a filtered noise reference signal; and combining the first audio signal from the first signal path and the filtered noise reference signal to obtain an output signal with reduced noise.

15. A computer program product including computer code on a non-transitory computer readable storage medium for determining a noise reference signal for noise compensation, the computer code comprising:

computer code for receiving a first audio signal on a first signal path and a second audio signal on a second signal path;

computer code for filtering the first audio signal using a first adaptive filter to obtain a first filtered audio signal;

computer code for filtering the second audio signal using a second adaptive filter to obtain a second filtered audio signal; and computer code for combining the first and the second filtered audio signal to obtain the noise reference signal; wherein the first and the second adaptive filter are adapted such as to minimize a wanted signal component in the noise reference signal;

wherein a first transfer function models a transfer from a wanted signal originating from a wanted sound source to the first signal path and a second transfer function models a transfer from the wanted signal originating from the wanted sound source to the second signal path, and wherein the transfer function of the first adaptive filter is based on the second transfer function and wherein the transfer function of the second adaptive filter is based on the first transfer function.

16. The computer program product according to claim 15, further comprising:

computer code for adapting the first and the second adaptive filter.

17. The computer program product according to claim 16, wherein the computer code for adapting the first and the second adaptive filter is based on a normalized least mean square method.

18. The computer program product according to claim 17, wherein the computer code for the normalized least mean square method comprises computer code for modifying a set of filter coefficients of the first and/or second adaptive filter based on the noise reference signal.

19. The computer program product according to claim 17, wherein the computer code for the normalized least mean square method comprises computer code for modifying a set of filter coefficients of the first and/or second adaptive filter based on the power or power density of the first and second audio signal.

20. The computer program product according to claim 17, wherein the computer code for adapting the first and the second adaptive filter comprises computer code for normalizing modified filter coefficients of the first and/or second adaptive filter using a predetermined normalization factor.

21. The computer program product according to claim 16 wherein the computer code for adapting the first and second adaptive filter is based on a minimization of the signal-to-noise ratio of the noise reference signal.

22. The computer program product according to claim 21, wherein the computer code for the method based on the minimization of the signal-to-noise ratio comprises computer code for determining a power or power density of the first and the second audio signal.

23. The computer program product according to claim 21, wherein computer code for the method based on the minimization of the signal-to-noise ratio comprises computer code for determining a power or power density of the noise component of the first and second audio signal.

24. The computer program product according to claim 21, wherein the computer code for minimizing the signal-to-noise ratio of the noise reference signal is based on the power or power density of the first and the second audio signal and on the power or power density of the noise component of the first and second audio signal.

25. A computer program product having computer code on a non-transitory computer readable storage medium, the computer code executable on a computer for processing an audio signal for noise compensation, computer code comprising:

computer code for determining a noise reference signal according to claim 15, using a first audio signal on a first signal path and a second audio signal on a second signal path;

computer code for filtering the noise reference signal on the second signal path using a third adaptive filter to obtain a filtered noise reference signal; and computer code for combining the first audio signal from the first signal path and the filtered noise reference signal to obtain an output signal with reduced noise.

* * * * *